No. 881,060. PATENTED MAR. 3, 1908.
J. J. COOK.
VALVE.
APPLICATION FILED JUNE 10, 1907.
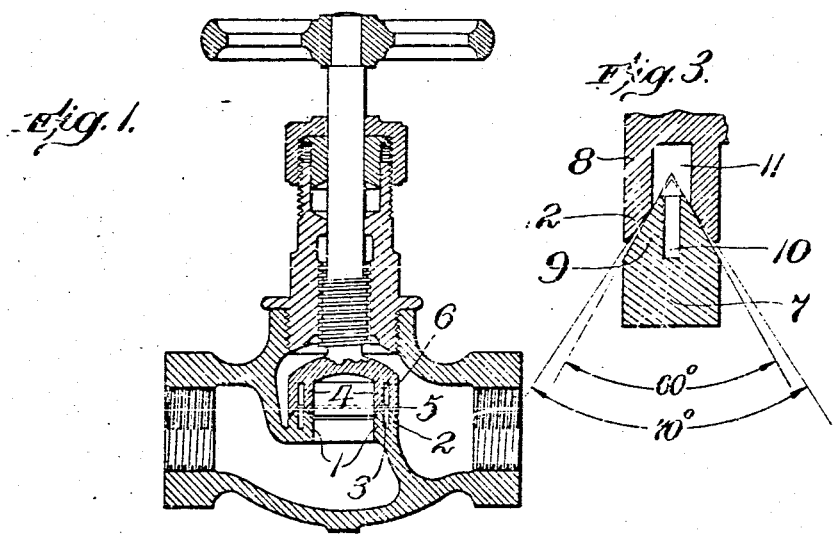
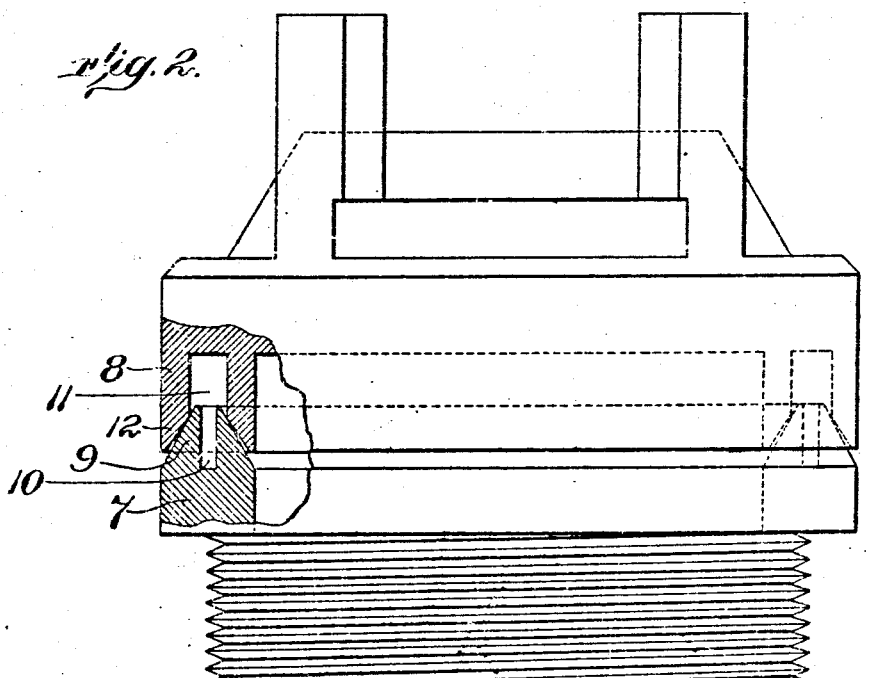
Witnesses:
H. C. Brwer.
M. G. Hennessy.
Inventor:
John J. Cook,
by Ralph W. Foster
Attorney.

UNITED STATES PATENT OFFICE.

JOHN J. COOK, OF MEDFORD, MASSACHUSETTS, ASSIGNOR TO CROSBY STEAM GAGE AND VALVE COMPANY, OF BOSTON, MASSACHUSETTS, A CORPORATION OF MASSACHUSETTS.

VALVE.

No. 881,060.     Specification of Letters Patent.     Patented March 3, 1908.

Application filed June 10, 1907. Serial No. 378,167.

*To all whom it may concern:*

Be it known that I, JOHN J. COOK, a citizen of the United States, and resident of Medford, in the county of Middlesex and State of Massachusetts, have invented certain new and useful Improvements in Valves, of which the following is a specification.

My invention relates to spring-seat valves, so called from the fact that a springing action takes place between the seats (disk and seat proper) each time the valve is operated, or its temperature varied.

The valve is adapted for steam, water, compressed air, gas or other fluid.

The object of the invention is to secure a close contact between the seats when closed, thus preventing leakage, to maintain such contact during any contraction or expansion of the parts caused by variation in temperature, and to minimize the friction between the seats.

The invention is an improvement on the spring-seat valve described in the United States Letters Patent, No. 553,939, issued February 4, 1896, to James Robinson and it is illustrated by the accompanying drawings in which similar characters refer to similar parts throughout.

Figure 1 is an elevation of the Robinson spring-seat valve referred to, with portions broken away and portions in section. Fig. 2 is an enlarged elevation partly in section showing my improvement. Fig. 3 is a section of the disk and seat showing their angles.

Robinson's valve comprises an annular seat 1 having an exteriorly conical upper part 2 with an interior, vertical, annular groove 3 and co-acting disk 4 having a corresponding, annular, interiorly conical lower part 5 leading into a corresponding, interior, vertical, annular groove 6, all so proportioned and having such angles that, when the disk is seated, the entire area of the exterior, conical surface of the seat engages the entire area of the interior, conical surface of the disk, while the interior, vertical grooves of seat and disk are joined end to end to form one vertical, annular groove, thus tending to impair the resiliency of the parts and the efficiency of the valve, and causing great friction between the seats. Moreover, it frequently happens in valves of the Robinson type that, in grinding the seats together, the circular, acute, angular edge of one seat grinds into some part of the conical surface of the other, thereby forming a shoulder which prevents the nearer approach of the seats to one another. To obviate these difficulties I make the disk and seat with their corresponding parts of different proportions and with different angles, instead of having them correspond at all points as in the Robinson valve.

Fig. 2 which illustrates my improved valve, shows the seat 7 and disk 8 so proportioned that the exteriorly conical, annular upper part 9 of the seat with its vertical, annular groove 10 extends into the vertical, annular groove 11 in the interiorly conical annulus 12 of the disk, and the exterior, conical surface of the seat incloses a lesser angle than that inclosed by the interior, conical surface of the disk; the result being that the contact between the disk and seat is substantially curvilinear, constituting a circle in a plane parallel to that of the base of the valve. The groove in the seat should be deep enough and the conical walls of the seat of the right thickness to insure their resiliency. There is, doubtless, some resiliency in the conical walls of the disk but much less than that in the walls of the seat. It is obvious that the angles and proportions of the seat and disk may be transposed without affecting the principle of the invention.

Figs. 2 and 3 show a conical seat whose exterior, conical surface extended would inclose an angle of 60°, and a disk whose interior, conical surface extended would inclose. an angle of 70°. I, however, do not limit myself to valves of such dimensions or relative proportions.

In operation, as pressure is exerted upon the disk the inclosed angle of the seat, 60°, will tend to increase while the inclosed angle of the disk, 70°, will also tend to increase, but to a less degree, and, as a result, the circle of contact between the disk and the seat will broaden to a greater or less extent depending upon the amount of pressure exerted upon the disk.

Having described my invention what I claim and desire to secure by Letters Patent is:

In a valve the combination, with an annular seat having an exteriorly conical upper part provided with an interior, vertical, annular groove, of a co-acting disk having a corresponding annular, interiorly conical lower part leading into an interior, vertical, annular groove, the groove of the disk being of greater width than the groove of the seat, and the conical walls of the disk inclosing a greater angle than the conical walls of the seat; substantially as described.

In testimony whereof I have affixed my signature, in presence of two witnesses.

JOHN J. COOK.

Witnesses:
HELEN M. DEARBORN,
RALPH W. FOSTER.